United States Patent
Kaufman et al.

(10) Patent No.: US 10,942,041 B2
(45) Date of Patent: Mar. 9, 2021

(54) CHEMOSENSING AUTONOMY SYSTEM FOR A VEHICLE

(71) Applicant: Aurora Flight Sciences Corporation, Manassas, VA (US)

(72) Inventors: Amanda Kaufman, Needham, MA (US); William Robert Bosworth, Somerville, MA (US); James Donald Paduano, Boston, MA (US); Riley C. Griffin, Cambridge, MA (US); Sachin Jain, Cambridge, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 36 days.

(21) Appl. No.: 16/047,727

(22) Filed: Jul. 27, 2018

(65) Prior Publication Data
US 2020/0033157 A1    Jan. 30, 2020

(51) Int. Cl.
*G01C 23/00* (2006.01)
*B64D 1/02* (2006.01)
(Continued)

(52) U.S. Cl.
CPC ............ *G01C 23/005* (2013.01); *B64D 1/02* (2013.01); *B64D 1/16* (2013.01); *G01N 1/2273* (2013.01); *G01P 13/00* (2013.01); *B64C 2201/125* (2013.01); *B64C 2201/126* (2013.01); *B64C 2201/127* (2013.01); *B64C 2201/14* (2013.01); *G01N 2001/2279* (2013.01)

(58) Field of Classification Search
CPC .......... G01C 23/005; B64D 1/02; B64D 1/16; G01N 1/2273; G01N 2001/2279; G01P 13/00; B64C 2201/125; B64C 2201/126; B64C 2201/127; B64C 2201/14
See application file for complete search history.

(56) References Cited

U.S. PATENT DOCUMENTS

| | | | | |
|---|---|---|---|---|
| 3,309,518 A | * | 3/1967 | Weiss | G01V 3/16 378/45 |
| 5,526,292 A | * | 6/1996 | Hodgson | G10K 11/178 700/280 |
| 5,722,618 A | * | 3/1998 | Jacobs | B64D 1/00 244/137.1 |

(Continued)

FOREIGN PATENT DOCUMENTS

| | | |
|---|---|---|
| JP | 2006 176073 A | 7/2006 |
| WO | 2017/052736 A1 | 3/2017 |

OTHER PUBLICATIONS

Singer, Neal. "Flying snifterSTAR may aid civilians and US military," Lab News. Sandia National Laboratories. Jan. 2003.

(Continued)

*Primary Examiner* — Rufus C Point
(74) *Attorney, Agent, or Firm* — Michael Stanley Tomsa; McAndrews, Held & Malloy, Ltd.; Eugene H. Nahm

(57) ABSTRACT

An aircraft, system, and method for sensing and/or releasing chemical agents by an aircraft is disclosed. The aircraft, system, and method may employ a chemical sensor, a wind sensor, an imaging device for capturing environmental features, and/or a processor operably coupled therewith. The processor may be used for collecting data from the chemical sensor, the wind sensor, and the imaging device to identify a navigational waypoint and to provide commands to the chemical sensor or to the aircraft based at least in part on collected data.

20 Claims, 5 Drawing Sheets

Figure 1A:
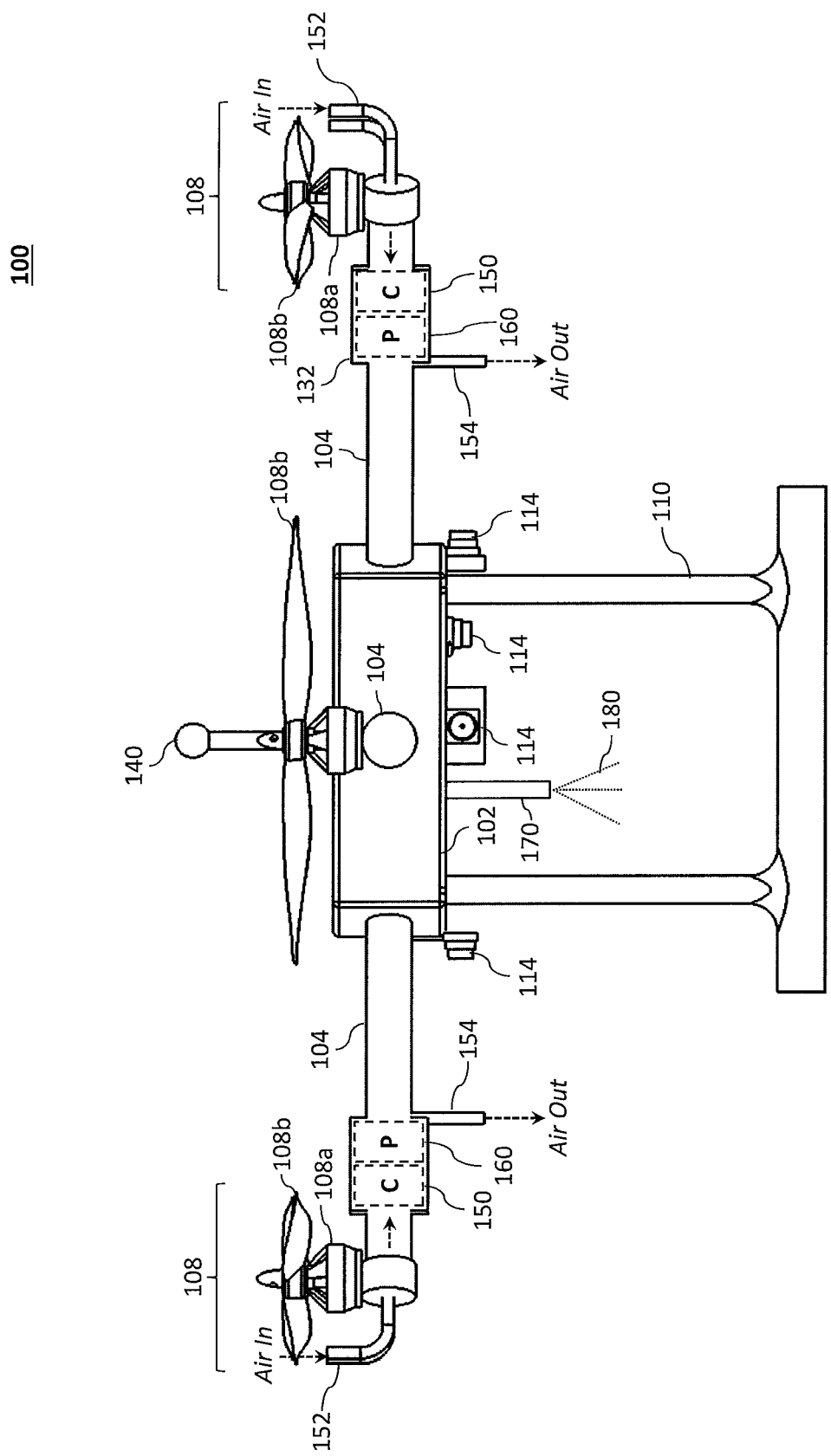

(51) Int. Cl.
*B64D 1/16* (2006.01)
*G01N 1/22* (2006.01)
*G01P 13/00* (2006.01)

(56) References Cited

U.S. PATENT DOCUMENTS

| | | | | |
|---|---|---|---|---|
| 5,773,710 | A * | 6/1998 | Squirrell | C12Q 1/04 |
| | | | | 73/28.01 |
| 6,442,997 | B1 * | 9/2002 | Megerle | G01N 1/2273 |
| | | | | 204/406 |
| 8,500,067 | B2 | 8/2013 | Woodworth et al. | |
| 8,721,383 | B2 | 5/2014 | Woodworth et al. | |
| 9,513,635 | B1 * | 12/2016 | Bethke | G01C 21/20 |
| 10,458,990 | B1 * | 10/2019 | Manautou | C12N 1/14 |
| 2005/0007257 | A1 | 1/2005 | Rast | |
| 2007/0281657 | A1 * | 12/2007 | Brommer | H02J 7/0044 |
| | | | | 455/334 |
| 2008/0262321 | A1 * | 10/2008 | Erad | B01L 3/50273 |
| | | | | 600/301 |
| 2010/0001211 | A1 * | 1/2010 | Huang | G01N 27/4141 |
| | | | | 250/492.1 |
| 2010/0198514 | A1 * | 8/2010 | Miralles | B64C 39/00 |
| | | | | 701/302 |
| 2011/0147513 | A1 | 6/2011 | Surmont | |
| 2016/0018559 | A1 * | 1/2016 | Levien | G01V 8/02 |
| | | | | 250/255 |
| 2016/0035224 | A1 | 2/2016 | Yang et al. | |
| 2016/0282872 | A1 * | 9/2016 | Ahmed | G05D 1/101 |
| 2016/0368604 | A1 * | 12/2016 | Duesterhoft | B64D 1/02 |
| 2017/0369168 | A1 * | 12/2017 | Hwang | A61L 9/14 |
| 2018/0004231 | A1 * | 1/2018 | Michini | G05D 1/101 |
| 2018/0074499 | A1 | 3/2018 | Cantrell et al. | |
| 2018/0284088 | A1 * | 10/2018 | Verbeck, IV | G01N 1/26 |
| 2018/0356841 | A1 * | 12/2018 | Zilberstein | G05D 1/104 |

OTHER PUBLICATIONS

Manginell, R.P., et al., "Monolithically-integrated MicroChemLab for gas phase chemical analysis," 7th Intl. Conf. Miniaturized Chem. Biochem. Anal. Syst., Oct. 5-9. 2003.

Sandia researchers win seven R&D 100 Awards, News Release, Jul. 23, 2003.

Lewis, P.R., et al., "Recent advances in the gas-phase MicroChemLab," IEEE Sensors Journal. 2006. 6(3): p. 784-795.

Sergi Bermúdez i Badia, et al., "A Biologically Based Chemo-Sensing UAV for Humanitarian Demining," International Journal of Advanced Robotic Systems, vol. 4, No. 2 (2007) ISSN 1729-8806, pp. 187-198.

Manginell, R.P., et al. "Smart microfabricated chemical preconcentrator," J. MEMS. 2008a. 17(6): p. 1396-1407.

Manginell, R.P., et al. "Mass sensitive, Lorentz-Force actuated, MEMS preconcentrator and chemical sensor". ECS Transactions. 2008b. 16(11): p. 155-163.

Manginell, R.P., et al. "A monolithically-integrated microGC chemical sensor system," Sensors. 2011. 11: p. 6517-6532.

Manginell, R.P., et al. "A materials investigation of a phase-change micro-valve for greenhouse gas collection and other potential applications," Review of Scientific Instruments. 2012. 83: p. 031301 (11 pp).

"Department of Defense Strategy for Countering Weapons of Mass Destruction," U.S. Department of Defense. Jun. 2014.

Miguel Alvarado, et al., "Towards the Development of a Low Cost Airborne Sensing System to Monitor Dust Particles after Blasting at Open-Pit Mine Sites," Sensors 2015, 15, 19667-19687; doi:10.3390/s150819667.

T.R. Bretschneider and K. Shetti, "UAV-Based Gas Pipeline Leak Detection," 2015.

Kent Rosser, et al., "Autonomous Chemical Vapour Detection by Micro UAV," Remote Sens. 2015, 7, 16865-16882; doi:10.3390/rs71215858.

F.E Idachaba, "Monitoring of Oil and Gas Pipelines by Use of VTOL-Type Unmanned Aerial Vehicles," Oil and Gas Facilities, 2016.

Jeremiah Karpowicz, "Detecting Radiological, Biological and Chemical Threats with Drones," Commercial UAV News, Sep. 23, 2016.

Yoon, S. et al. "Computational analysis of multi-rotor flows," NASA Ames Research Center. 2016.

Extended European Search Report (dated Dec. 19, 2019) corresponding to European Application No. EP 19188606.8.

\* cited by examiner

CHEMOSENSING AUTONOMY SYSTEM FOR A VEHICLE

FIELD

This present disclosure generally relates to systems and methods for detecting or releasing chemical reagent and, more specifically, to systems and methods for automatically releasing or sensing a chemical agent via an unmanned aerial vehicle.

BACKGROUND

In recent years, unmanned aerial vehicles (UAVs) have been widely used in various fields such as aerial photography, surveillance, scientific research, geological survey, and remote sensing. UAVs may carry onboard a variety of electrical components used to control various aspects of the operation of the UAVs. UAVs may also carry one or more sensors for navigational, surveillance, or remote sensing purposes.

Previous attempts at integrating advanced chemical sensing with unmanned aerial vehicles has resulted in platforms that are relatively slow or cumbersome (e.g., blimps), are too large and fast to provide methodical environmental characterization (e.g., larger fixed wing unmanned aircraft system (UAS)), or are too hindered by large payloads to perform meaningful missions. In the few efforts that have produced flying vehicles, no infusion of autonomy (such as chemical plume tracking navigation) has been successfully implemented.

Therefore, many environmental investigations for chemical reagents still require the use of hand-held devices, which presents a risk to on-site personnel. For some operations, such as arms verification missions in hostile territories, there is no effective way to acquire remote chemical sensor data. Therefore, there is a need automatic sensing an odor or a chemical agent by the UAVs.

SUMMARY

The present disclosure is directed to an automatically releasing and/or sensing a chemical agent via unmanned aerial vehicle.

According to a first aspect, a chemical sensing system for navigating a vehicle to a source of a chemical agent comprises: a chemical sensor to provide chemical data reflecting one or more chemical agents in the air; a wind sensor to provide wind data reflecting one or more flow conditions of the air; and an processor to identify a navigational waypoint for the aircraft and to provide flight commands to the aircraft based at least in part on the chemical data and the wind data.

In certain aspects, an imaging device to provide image data reflecting one or more environmental features, wherein the processor is configured to provide flight commands to the aircraft based at least in part on the image data.

In certain aspects, the chemical sensing system further comprises a chemical discharge port to discharge a chemical agent from a chemical storage unit aboard the aircraft.

In certain aspects, the chemical sensing system further comprises a pressure sensor to detect dynamic pressure adjacent the chemical sensor.

In certain aspects, the processor is configured to send a command to desorb chemicals from a sensing film of the chemical sensor in the event of saturation of the sensing film.

In certain aspects, the imaging device comprises a camera or a video recorder.

In certain aspects, the processor is configured to estimate velocity of the aircraft based at least in part on the image data through one or more optical flow techniques.

In certain aspects, the vehicle is an aircraft.

According to a second aspect, an aircraft for sensing air external to the aircraft comprises: an airframe; a propulsor comprising a motor operatively coupled with a propeller; a chemical sensor to provide chemical data reflecting one or more chemical agents in the air, the chemical sensor fluidly coupled to an inlet port and to an outlet port; a wind sensor to provide wind data reflecting one or more flow conditions of the air; and a processor communicatively coupled with the chemical sensor and the wind sensor, the processor configured to process the chemical data and the wind data to detect a chemical plume comprising a predetermined chemical agent.

In certain aspects, the processor is configured to identify a navigational waypoint and to provide commands to a flight controller of the aircraft based at least in part on collected data.

In certain aspects, the processor is communicatively coupled with an imaging device to provide image data reflecting one or more environmental features, wherein the processor is configured to estimate velocity of the aircraft based at least in part on the image data through one or more optical flow techniques.

In certain aspects, the processor is configured to identify a wind direction of a chemical plume based at least in part on the wind data.

In certain aspects, the processor is configured to identify a source of the chemical plume through an upwind tracking process.

In certain aspects, the upwind tracking process comprising tracking the chemical plume to the source using wind speed or wind direction from a position to determine a prior position of the chemical plume.

In certain aspects, the processor is configured to determine a velocity vector reflecting a speed and the wind direction of the air based at least in part on the wind data.

In certain aspects, the aircraft further comprises a chemical discharge port to discharge a chemical agent from a chemical storage unit aboard the aircraft.

In certain aspects, the inlet port is positioned on the aircraft within prop wash generated by the propeller.

In certain aspects, the inlet port is positioned with its opening directed toward the propeller.

In certain aspects, the outlet port is positioned on the aircraft and configured to expel air away from the propeller.

In certain aspects, the processor is configured to estimate a flight path as a function of the chemical data and the wind data.

In certain aspects, the processor is configured to determine an odor intensity based at least in part on the chemical data.

In certain aspects, the aircraft further comprises a pressure sensor to detect dynamic pressure adjacent the chemical sensor.

In certain aspects, the aircraft further comprises at least one rotor boom extending radially from the airframe, wherein the propulsor is positioned at a distal end of said at least one rotor boom.

In certain aspects, the aircraft further comprises a plurality of rotor booms extending radially from the airframe, wherein each of the plurality of rotor booms comprises a propulsor and a chemical sensor positioned at its distal end.

In certain aspects, the aircraft is a multi-rotor vertical take-off and landing (VTOL) unmanned aerial vehicle (UAV).

In certain aspects, the chemical sensor is provided via an external payload.

In certain aspects, the external payload is configured to be suspended from the aircraft via a tether in a slung-load arrangement.

According to a third aspect, a method for navigating an aircraft to a source of a chemical agent comprises: receiving chemical data from a chemical sensor reflecting one or more chemical agents in the air; receiving wind data from a wind sensor reflecting one or more flow conditions of the air; and identifying, via a processor operatively coupled to the chemical sensor and the wind sensor, a navigational waypoint based at least in part on the chemical data and the wind data.

In certain aspects, the method further comprises the step of detecting, via a pressure sensor, dynamic pressure adjacent the chemical sensor.

In certain aspects, the method further comprises the step of providing, via the processor, a command to desorb chemicals from a sensing film of the chemical sensor in the event of saturation of the sensing film.

According to a fourth aspect, an aircraft for sensing and releasing chemical agents comprises: an airframe; a propulsor having a rotor; a chemical sensor having an inlet port, wherein the inlet port is positioned under the rotor; a chemical discharge port to discharge a chemical agent from a chemical storage unit aboard the aircraft; and a processor communicatively coupled with the chemical discharge port and configured to selectively discharge the chemical agent via the chemical discharge port.

In certain aspects, the processor is operatively coupled with a wind sensor that is configured to provide wind data reflecting one or more flow conditions of air external to the aircraft, wherein the processor is configured to identify a wind direction of a chemical plume based at least in part on the wind data.

In certain aspects, the aircraft further comprises an imaging device to provide image data reflecting one or more environmental features, wherein the processor is configured to estimate velocity of the aircraft based at least in part on the image data through one or more optical flow techniques.

In certain aspects, the processor is configured to send one or more commands to the chemical sensor.

In certain aspects, the one or more commands include a command to desorb chemicals from a sensing film of the chemical sensor in the event of saturation of the sensing film.

In certain aspects, the processor is configured to estimate an amount of chemicals that have flowed through the chemical sensor and to identify an appropriate time for sensor desorption.

DRAWINGS

The foregoing and other objects, features, and advantages of the devices, systems, and methods described herein will be apparent from the following description of particular embodiments thereof, as illustrated in the accompanying figures, where like reference numbers refer to like structures. The figures are not necessarily to scale, emphasis instead is being placed upon illustrating the principles of the devices, systems, and methods described herein.

FIGS. 1*a* through 1*c* illustrates an exemplary multi-rotor vertical take-off and landing (VTOL) UAV equipped with a chemical releasing or sensing system.

FIG. 2 illustrates an exemplary control system for a UAV having a chemical releasing or sensing system.

FIG. 3 illustrates an example process diagram of upwind tracking and verification of a chemical plume to its source via an aircraft.

FIGS. 4*a* and 4*b* illustrate an exemplary multi-rotor VTOL UAV equipped with a slung-load sensor payload to provide chemical releasing and/or sensing.

DESCRIPTION

Preferred embodiments of the present disclosure will be described hereinbelow with reference to the accompanying drawings. The components in the drawings are not necessarily drawn to scale, the emphasis instead being placed upon clearly illustrating the principles of the present embodiments. For instance, the size of an element may be exaggerated for clarity and convenience of description. Moreover, wherever possible, the same reference numbers are used throughout the drawings to refer to the same or like elements of an embodiment. In the following description, well-known functions or constructions are not described in detail because they may obscure the disclosure in unnecessary detail. No language in the specification should be construed as indicating any unclaimed element as essential to the practice of the embodiments.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "side," "front," "back," and the like, are words of convenience and are not to be construed as limiting terms. The various data values (e.g., voltages, seconds, etc.) provided herein may be substituted with one or more other predetermined data values and, therefore, should not be viewed limiting, but rather, exemplary. For this disclosure, the following terms and definitions shall apply:

The terms "aerial vehicle" and "aircraft" refer to a machine capable of flight, including, but not limited to, fixed-wing aircraft, unmanned aerial vehicle, variable wing aircraft, and vertical take-off and landing (VTOL) aircraft.

The term "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

The terms "circuits" and "circuitry" refer to physical electronic components (e.g., hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory trim, etc.).

The terms "communicate" and "communicating" as used herein, include both conveying data from a source to a destination and delivering data to a communications medium, system, channel, network, device, wire, cable, fiber, circuit, and/or link to be conveyed to a destination. The term "communication" as used herein means data so conveyed or delivered. The term "communications" as used herein includes one or more of a communications medium, system, channel, network, device, wire, cable, fiber, circuit, and/or link.

The terms "coupled," "coupled to," and "coupled with" as used herein, each mean a relationship between or among two or more devices, apparatuses, files, circuits, elements, functions, operations, processes, programs, media, components, networks, systems, subsystems, and/or means, constituting any one or more of: (i) a connection, whether direct or through one or more other devices, apparatuses, files, circuits, elements, functions, operations, processes, programs, media, components, networks, systems, subsystems, or means; (ii) a communications relationship, whether direct or through one or more other devices, apparatuses, files, circuits, elements, functions, operations, processes, programs, media, components, networks, systems, subsystems, or means; and/or (iii) a functional relationship in which the operation of any one or more devices, apparatuses, files, circuits, elements, functions, operations, processes, programs, media, components, networks, systems, subsystems, or means depends, in whole or in part, on the operation of any one or more others thereof.

The term "data" as used herein means any indicia, signals, marks, symbols, domains, symbol sets, representations, and any other physical form or forms representing information, whether permanent or temporary, whether visible, audible, acoustic, electric, magnetic, electromagnetic, or otherwise manifested. The term "data" is used to represent predetermined information in one physical form, encompassing any and all representations of corresponding information in a different physical form or forms.

The term "database" as used herein means an organized body of related data, regardless of the manner in which the data or the organized body thereof is represented. For example, the organized body of related data may be in the form of one or more of a table, map, grid, packet, datagram, frame, file, email, message, document, report, list, or in any other form.

The term "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

The term "memory device" means computer hardware or circuitry to store information for use by a processor. The memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The term "network" as used herein includes both networks and inter-networks of all kinds, including the Internet, and is not limited to any particular network or inter-network.

The term "processor" means processing devices, apparatuses, programs, circuits, components, systems, and subsystems, whether implemented in hardware, tangibly embodied software, or both, and whether or not it is programmable. The term "processor" includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with, a memory device.

Disclosed herein is a chemical releasing and/or detecting system for an aircraft, such an unmanned aerial vehicle (UAV). The chemical releasing and/or detecting system may employ a chemical-sensing or chemical autonomy system in connection with other sensors. For example, in certain aspects, the chemical releasing or detecting system may comprise a chemical sensor, a wind sensor, one or more imaging devices, and an onboard processing unit (e.g., a processor, memory, and/or drive circuitry) operatively coupled with the one or more sensors. That is, the onboard processing unit may comprise a processor and associated drive circuitry (e.g., for the various sensors, actuators, etc.). Sensor fusion between chemical sensing data, wind direction data, and visual data enables the UAV to track, for example, chemical plumes to their source, thereby providing a crucial capability for applications including, inter alia, arms verification, chemical spill investigations, and demining efforts. Through an onboard transceiver, telemetry, and radio communications, the UAV can provide real-time information to an operator pertaining to chemical reagents and/or its location without introducing risk to the operator. The chemical releasing and/or detecting system provides a cost-effective technology that is particularly important when deployed into contaminated regions where safe recovery of the UAV may not be possible.

The chemical releasing and/or detecting system can also be used for multi-UAV navigation. That is, a family of aerial vehicles may work in teams to gather intelligence. For example, a swarm of aerial vehicles (e.g., 10 to 100 aerial vehicles) can be divided into a plurality of teams (e.g., about 2 to 20, more preferably about 5 to 15, or most preferably about 10 teams), with each team having a plurality of aerial vehicles (e.g., about 2 to 20, more preferably about 5 to 15, or most preferably about 10 teams). Each team may have a team leader (e.g., a master UAV) configure to release a distinct chemical that enables the team members (e.g., slave UAVs) to recognize and track (i.e., follow) the team leader. For example, the team leader can release pheromones into the air that the other UAVs can use to determine the travel directions and destinations that have already been explored by other UAVs, for example.

Figure 1B:
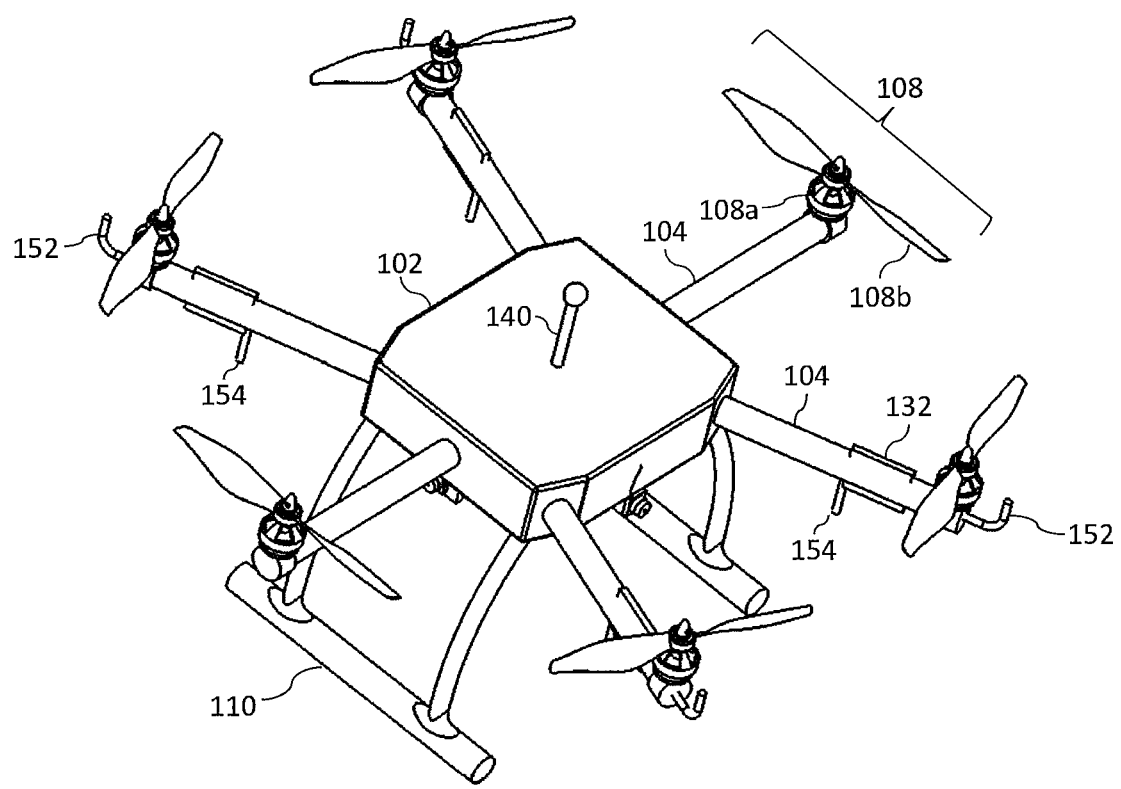
Figure 1C:
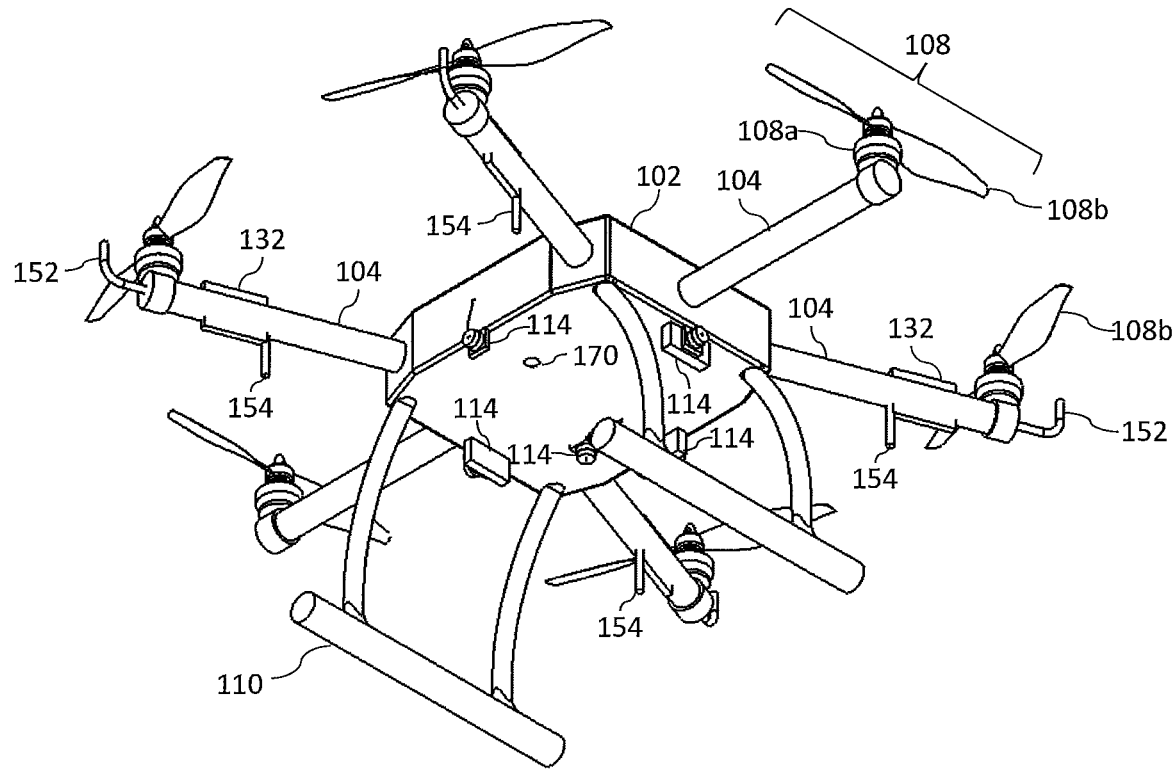

Multi-Rotor VTOL UAV. A suitable aircraft 100 for use with the chemical sensing and/or releasing system can be configured as a multi-rotor VTOL UAV, an example of which is illustrated in FIGS. 1a through 1c. Specifically, FIG. 1a illustrates a side view of the aircraft 100, while FIGS. 1b and 1c illustrate, respectively, top and bottom isometric views of the aircraft 100. As illustrated, the aircraft 100 generally comprises an airframe 102 (e.g., a fuselage), a plurality of rotor booms 104 (e.g., longitudinal booms) extending radially from the airframe 102, landing gear 110, and a plurality of propulsors 108.

The airframe 102 may be coupled with a proximal end of each of the plurality of rotor booms 104 such that the distal ends of the plurality of rotor booms 104 extend radially from the airframe 102. The airframe 102 and the plurality of rotor booms 104 may be fabricated as a singular unit, or as separate components to be coupled to one another. The distal end of each of the plurality of rotor booms 104 may be coupled with a propulsor 108, each of which is illustrated with a propeller 108b coupled to an electric motor 108a to drive/rotate the propeller 108b. Each of said plurality of propulsors 108 can be positioned at a distal end of a rotor boom 104 and oriented to direct thrust downward (relative to the airframe 102) to provide lift, thereby achieving, inter alia, VTOL functionality. The electric motor 108a may be an electric motor controlled via an electronic speed controller (ESC) 106. To that end, an ESC 106 may also be provided, for example, within the rotor boom 104 and/or adjacent the electric motor 108a at the distal end of a rotor boom 104.

While the electric motors 108a are illustrated at the distal end of each rotor booms 104, the electric motors 108a (or a single electric motor 108a) may instead be positioned at the airframe 102 and configured to drive (rotate) one or more propellers 108b via a gearbox and/or a driveshaft between the electric motor 108a and the one or more propellers 108b. Further, while each rotor boom 104 is illustrated as having only a single propulsor 108, multiple propulsors 108 may be provided at the distal end of each rotor booms 104. For example, a cross-member may be positioned at the distal end of each rotor booms 104 and arranged to space the propulsors 108 from one another (e.g., perpendicularly to the length of the rotor boom 104) or to otherwise prevent interference between propellers 108b (e.g., a staggered/overlapping configuration). The components of the aircraft 100 may be fabricated from metal, a composite material, or a combination thereof.

As illustrated, the aircraft 100 may be equipped with a plurality of imaging devices 114. The imaging device 114 may be, or comprise, inter alia, radar-based sensors, a camera, a video recorder, and other optical devices (e.g., LIDAR). The one or more imaging devices may be positioned to capture images and/or video of a scene external to the aircraft 100, such as environmental features. For example, as illustrated, an imaging device 114 may be provided on the left, right, front, and rear of the airframe 102 to provide a 360 degree field of view about the airframe 102. Additional imaging devices 114 may also be provided on the top and/or bottom of the airframe 102 to provide a field of view above and below the airframe 102. In certain aspects, an imaging device 114 may be rotatably and pivotally coupled to the airframe 102 (e.g., at the underside) via one or more gimbal devices. In certain aspects, the one or more imaging devices 114 may be directed downward (relative to the aircraft 100) to image a feature below. The one or more imaging devices 114 can be configured to identify environmental features, to provide velocity estimates, or both. As such, the one or more imaging devices 114 can be used to improve accuracy of a wind speed probe (e.g., through one or more optical flow techniques).

To provide the chemical releasing and/or detecting system, the aircraft 100 may employ a chemical sensing system 112. For example, the aircraft 100 may be equipped with a chemical sensor 150, a pressure sensor 160, an inlet port 152, and a chemical discharging port 170. For example, one or more of the rotor booms 104 may be shaped to define a sensor housing 132, which may contain, for example, the chemical sensor 150 and/or pressure sensor 160.

The chemical sensors 150 can be positioned in strategic locations throughout the aircraft 100 to optimize both concentrator performance and directional detection. For example, the propellers 108b also provide a source of dynamic pressure that can be used to push air through the inlet port 152 and out the outlet port 154 (thereby passing the air through chemical sensing system, such as the 150. For a VTOL rotorcraft, as illustrated, the inlet ports 152 may be positioned on the aircraft 100 (e.g., the rotor boom 104) such that, during operation, it resides within the prop wash of the propellers 108b, thereby taking advantage of dynamic pressure. As will be appreciated, the term "prop wash" refers to the air current created by the action of a propeller 108b. In another example, the inlet ports 152 may be positioned at a leading edge of the aircraft 100, such that a positive dynamic pressure pushes air through the inlet ports 152 during flight. In addition, the inlet ports 152 may be retractable, such that they are positioned within the prop wash selectively (e.g., between an extended and/or retracted position).

The inlet port 152 may be positioned at the distal end of the rotor boom 104 (e.g., outboard the electric motor 108a) facing upward under the propeller 108b to receive air from the environment and to supply the air to the chemical sensor 150 (e.g., within the sensor housing 132), which can be expelled via the outlet port 154. For example, the inlet ports 152 may be shaped as a tube with having an opening that directs airflow toward the chemical sensor 150. For example, the inlet port's 152 open end (opening) may face the underside of the propeller 108b (e.g., upward from the rotor boom 104) such that the prop wash is directed into the inlet port 152. In other words, the inlet port 152 may be positioned on the aircraft 100 within the prop wash generated by the propeller 108b (rotor, or other thruster). In certain aspects, the inlet port 152 may be positioned with its opening directed toward the propeller.

The outlet port 154 may be positioned inboard of the electric motor 108a and arranged to face downward (i.e., opposite that of the inlet port 152). In certain aspects, the outlet port 154 may be positioned on the aircraft 100 and configured to expel air from the chemical sensor away from the propeller 108b. For example, the outlet port(s) 154 may also be shaped as a tube with its open end facing away from the propeller 108b (e.g., downward from the rotor boom 104) such that air expelled from the outlet port 154 travels in the same direction as the prop wash from the propeller 108*b*. Accordingly, the outlet port 154 can be arranged to take advantage of ejector effects from the exhaust of the propellers 108*b*.

The pressure sensor 160 can be configured to detect dynamic pressure adjacent (e.g., at or near) the chemical sensor 150. Therefore, in certain aspects, the pressure sensor 160 may be positioned on the aircraft 100 (e.g., the rotor boom 104) such that, during operation, it also resides within the prop wash of the propellers 108*b*. In another aspect, the pressure sensor 160 may be positioned elsewhere on the aircraft 100. A chemical sensor 150 and a pressure sensor 160 may be provided on multiple rotor booms 104. As illustrated, for example, four rotor booms 104 may comprise toward its distal end a chemical sensor 150 and a pressure sensor 160.

The aircraft 100 may be equipped with a wind sensor 140 which is configured to identify wind direction and or wind speed that may carry a chemical plume away from its source. The wind sensor 140 may include airflow sensors, accelerometers, pitot tube static anemometer, or other types of anemometers. The wind sensor 140 may be positioned, for example, on top of the airframe 102, though other positioned are possible. Similarly, the wind sensor 140 may be positioned, for example, at a leading face of the airframe. For example, the wind sensor 140 may be placed at a distal end of an extending arm formed at the forward face of the aircraft 100 in flight. One consideration, however, is to position the wind sensor 140 outside the prop wash to mitigate adversely affecting measurements taken by the wind sensor 140. In some aspects, the velocity of the wind may be determined based on the input from the wind sensor 140 and other on-board sensors to discount airflow generated by the moving aircraft 100, such as the prop wash or airflow around the aircraft.

The chemical discharge port 170 (e.g., a discharge nozzle coupled to a pump) may be connected to a chemical storage unit 175 to store a chemical. The chemical storage unit may be located within the aircraft 100 (e.g., within the airframe 102) to mitigate any unnecessary drag in-flight. The chemical discharge port 170 may be configured to draw (via the pump) and discharge (via a discharge nozzle) a chemical agent that may be stored in the chemical storage unit 175. The chemical agent may be discharged in the form of, for example, a mist or spray 180. In certain aspects, the chemical discharge port 170 may be integrated with the outlet port 154 such that the mist or spray 180 is expelled via the outlet port 154 (or another common port or nozzle). Accordingly, the chemical sensing system 112 may further comprise a chemical discharge port 170 to discharge a chemical agent from a chemical storage unit 175 aboard the aircraft 100 (e.g., within the airframe 102, wings, rotor boom 104). The discharged chemical agent in the air may be utilized to determine the travel directions and destinations (estimated flight path) of the discharging aircraft (e.g., the master UAV) by other aircraft.

The flight controller 120 be operatively coupled with the discharge port 170 via the processor 116, and configured to discharge a predetermined amount of the chemical agent to be detected by another device (e.g., a ground station or another UAV) or a person. For example, the master UAV can release a particular chemical odor via a discharge port 170 and the slave UAV can then use the onboard chemical sensors 150 to detect the chemical odor and to navigate in the direction of the master UAV based at least in part on the location of the source of the chemical odor (i.e., the master UAV).

In a multi-aircraft cooperation, the master UAV may release chemical reagents via the discharge port 170 periodically as it travels. The release may be periodic temporally or spatially. The slave UAV may track the master UAV by detecting the released chemical reagents using the chemical sensor 150. For example, the slave UAV may identify the wind direction and/or wind speed (e.g., wind velocity vector) using the wind sensor 140. Based on the wind velocity vector, the onboard processor of the slave UAV may estimate the next waypoint from the initial detection of chemical reagent at the initial detection location. In some aspects, the slave UAV may also utilize the imaging devices 114 to identify visually the master UAV. As such, multiple sensors (e.g., a combination of the chemical sensor, wind sensor, and imaging device) may be collaboratively utilized to determine the next waypoint or to detect the master UAV. In some aspects, the slave UAV may employ an estimation technique, such as Kalman Filter, to estimate a flight path of the master UAV based on the multiple sensor input. Based on two or more locations where the released chemical reagent is detected, the slave UAV may determine an estimated flight path of the master UAV. The intensity or concentration level of the release chemical reagent may be detected by the chemical sensor 150 and factored into determining the next way point or validating the estimated flight path. For example, the intensity or concentration level may be expected to intensify as the slave UAV travels closer to the source of the chemical reagent, such as the master UAV. As such, if the chemical sensor 150 detects a decrease in the intensity level as the slave UAV travels along the estimated flight path, the processor may determine that the estimated flight path is in error, thus the slave UAV may be operated to loiter to recalculate or reevaluate the sensor inputs.

In some embodiments, the master UAV may release a predetermined type of chemical reagent to send a warning or a distress signal to the following slave UAV. In this embodiment, the slave UAV may be configured to execute a certain task (e.g., halt, return to base, pitch up, etc.) upon detection of the predetermine type of chemical reagent using the chemical sensor.

While the aircraft 100 is illustrated as having six propulsors 108 (i.e., an hexa-rotor aircraft), a person of skill in the art would understand that additional, or fewer, propulsors 108 may be employed to achieve a desired function and depending on, for example, thrust requirements. Further, while a rotorcraft is illustrated, other aircraft configurations, including fixed-wing aircraft, tilt-wing aircraft, and non-aircraft systems can be used in connection with the described chemical releasing and/or detecting system.

Implementation on a fixed-wing aircraft may leverage dynamic pressure from forward flight. A fixed-wing aircraft may comprise, for example, a fuselage, one or more primary wings, tail stabilizers (e.g., an empennage), and a propulsion system to generate the thrust necessary for flight (e.g., vertical and/or forward flight). The fuselage may be distinct from the one or more primary wings or integral therewith (e.g., a blended wing configuration). In another aspect, a configuration without a definite fuselage called a flying wing may be employed. An example fixed-wing aircraft suitable for use with the described chemical releasing and/or detecting system is described by commonly owned U.S. Pat. No. 8,721,383 (filed Sep. 9, 2009) and U.S. Pat. No. 8,500,067 (filed Aug. 4, 2012), each of which are entitled "Modular Miniature Unmanned Aircraft With Vectored-Thrust Control." For example, the inlet port to the chemical sensor and/or the pressure sensor may be provided on a leading edge of a lifting body (e.g., the primary wing and/or the tail), while the discharging port may be provided aft of the leading edge (e.g., at the underside of the lifting body or at the trailing edge). In another aspect, a sensor pod (e.g., chemical sensor and/or the pressure sensor) may be coupled to the fuselage.

Figure 2:
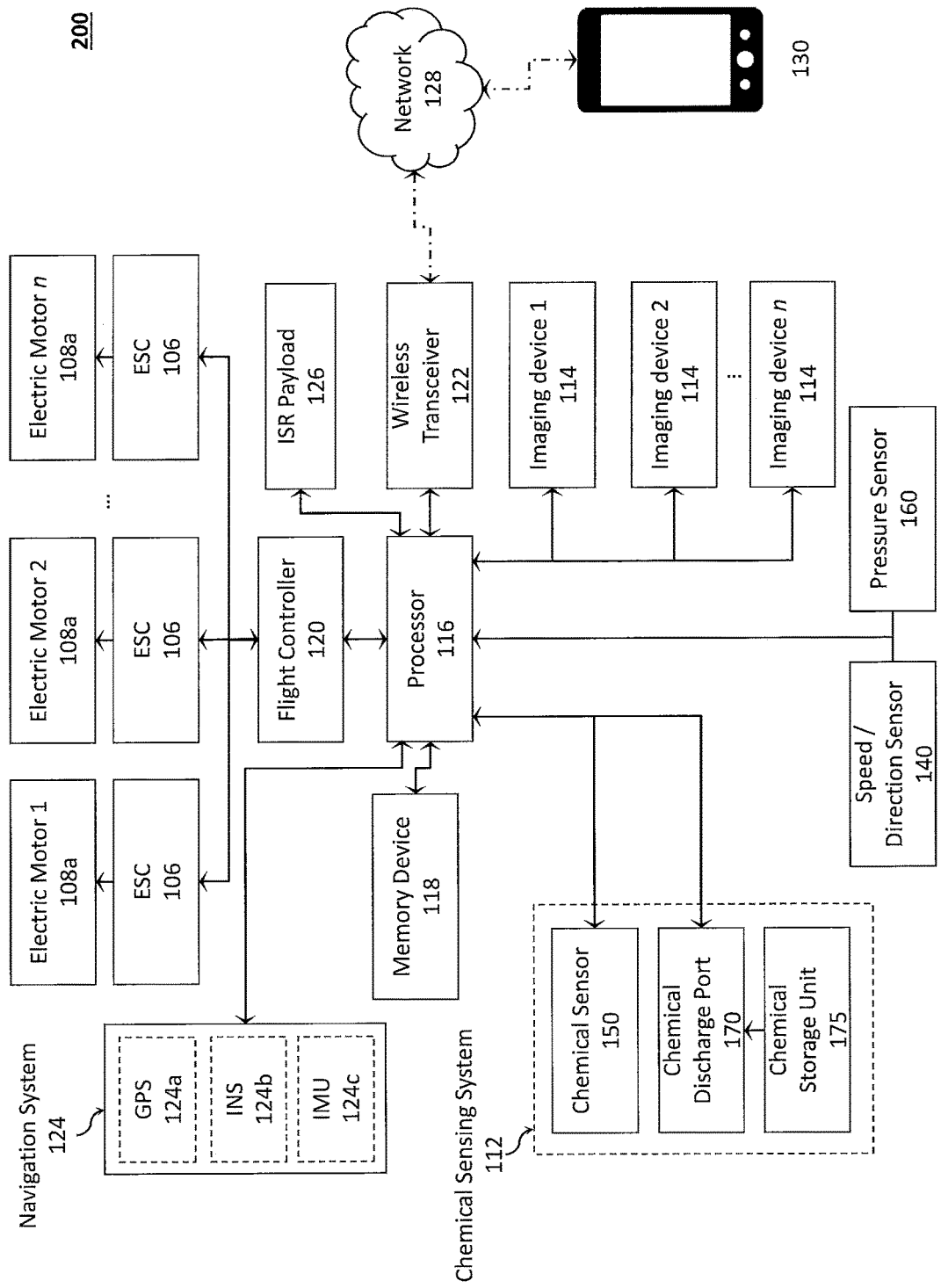

FIG. 2 illustrates a block diagram of an example aircraft control system 200 with a chemical sensing system 112 to provide chemical releasing and/or detection functionality. The aircraft control system 200 is configured to control the various aircraft components and functions of the aircraft 100. As illustrated, the aircraft 100 includes one or more processors 116 communicatively coupled with one or more memory devices 118, an flight controller 120, a wireless transceiver 122, a navigation system 124, a chemical sensing system 112, one or more imaging devices 114, a wind sensor 140, a pressure sensor 160, and/or an intelligence, surveillance, and reconnaissance (ISR) payload 126.

The one or more processors 116 may be configured to perform one or more operations based at least in part on instructions (e.g., software) and one or more databases stored to the memory device 118 (e.g., hard drive, flash memory, or the like). The aircraft control system 200 may further include other desired services, such as a wireless transceiver 122 to communicate data between the aircraft 100 and a remote device 130 (e.g., portable electronic devices, such as smartphones, tablets, and laptop computers) or other controller (e.g., a base station). For example, the aircraft 100 may communicate data (processed data, unprocessed data, etc.) with the remote device 130 over a network 128.

The processor 116 may be operatively coupled to the flight controller 120 to control operation of the various actuators (e.g., those to control movement of any flight surfaces) and/or electric motor 108a (e.g., via ESC 106) in response to commands from an operator, autopilot, the navigation system 124, the chemical sensing system 112, or other high-level systems via the wireless transceiver 122. In operation, the flight controller 120 may dynamically (i.e., in real-time or near real-time) and independently adjust thrust from each of the electric motors 108a on each rotor boom 104 during the various stages of flight (e.g., take-off, cruising, landing) via the ESC 106 to control roll, pitch, or yaw of the aircraft 100. In other words, the flight controller 120 can independently control each of the electric motors 108a on a given rotor boom 104 to generate a desired lift thrust for each of the electric motors 108a. For example, when rotors with rotor blades (e.g., propellers 108b) are used, the flight controller 120 may vary the RPM of the rotor and/or, where desired, vary the pitch of the rotor blade. Specifically, the electric motors 108a may be controlled by adjusting power supplied to each electric motor from a power supply (e.g., a battery pack or a battery bank) via the ESC 106. While the processor 116 and the flight controller 120 are illustrated as separate components, the processor 116 and the flight controller 120 (or functionality thereof) may be integrated into a single component or device.

The processor 116 may be operatively coupled to the navigation system 124, which may include a global positioning system (GPS) 124a that is communicatively coupled with an Inertial Navigation System ("INS") 124b and/or an inertial measurement unit (IMU) 124c. The GPS 124a gives an absolute drift-free position value that can be used to reset the INS solution or can be blended with it by use of a mathematical algorithm, such as a Kalman Filter. The navigation system 124 can be used to determine the position and attitude for an aircraft 100, where accelerations and angular rates from the accelerometers and gyroscopes of the IMU 124c can be integrated forward in time, and updates from the GPS can be used to bind the errors that result from the integration.

While generally reliable, reliance on an external network (e.g., a GPS network) can result in a failure if the external network is unavailable (e.g., the aircraft 100 is operated in a dead-zone, where there is no signal). Further, GPS signals can suffer from obstructions or multipath in cluttered environments, and the reception of these signals can furthermore be jammed or denied. Therefore, reliance solely on the reception of external signals from a GPS network can render the aircraft 100 prone to certain modes of failure.

In a GPS-denied environment, the aircraft 100 may employ a vision-based navigation via the ISR payload 126 and/or the imaging devices 114. Vision-based navigation can be advantageous because it is not reliant on external systems; however vision-based navigation also has certain negatives. For instance, vision-based navigation is less reliable in environments subject to, or prone to, obstructions (e.g., cloudy environments).

To address this potential deficiency, the chemical sensing system 112 may be used during navigation. For example, the chemical sensing system 112 may supplement existing systems and/or be used when existing systems are unavailable (e.g., damaged or unusable due to flight conditions). To that end, the processor 116 may be operatively coupled with a chemical sensing system 112, which may comprise, inter alia, a chemical sensor 150 and a chemical discharge port 170 coupled to a chemical storage unit 175.

The chemical sensing system 112 may be used to facilitate chemical sensing and releasing functionality. For example, in operation, the flight controller 120 may be used to collect data from the chemical sensor 150, the wind sensor 140, and the imaging device(s) 114 to determine (or identify) navigational waypoints and provide commands to the chemical sensor 150 based on the collected data. For example, the processor 116 may be configured to collect chemical data from the chemical sensors 150, process the chemical data, and provide commands to the flight controller 120. The onboard processor 116 processes data from each sensor source and identifies waypoints for chemical plume tracking navigation for the aircraft. While a single processor 116 is illustrated, multiple processors may be employed. For example, a dedicated processor may be used for the chemical sensing system 112 (or other sensors systems, such as the ISR payload 126) that is separate from the processor used to instruct the flight controller 120.

For example, the aircraft 100 may loiter to locate an initial identification (or a trace) of a chemical reagent using the chemical sensor 150 or the imaging devices 114. Based at least on the data collected from the wind sensor 140, the onboard processor 116 may identify the next waypoint(s) for the aircraft 100 to maneuver towards. As discussed herein, wind direction and/or speed may be identified by the wind sensor 140 and factored into determining the next waypoint(s). The intensity or concentration level of the chemical reagent in the chemical plume may be detected by the chemical sensor 150. Such intensity data may be utilized when a selection is needed between conflicting traces of chemical reagent. For example, due to turbulence or isolated change in wind direction, multiple waypoints may be identified based on multiple identification of chemical reagent in the air. In this example, the onboard processor 116 may select the waypoint having the strongest intensity. In some aspects, the onboard processor 116 may determine an estimated path of the chemical reagent based on two or more prior waypoint locations. The estimated path may be extrapolated based on the data collected previously from the multiple sensors (e.g., the wind sensor 140, the chemical sensor 150, and the imaging devices 114).

Therefore, in one aspect, the aircraft 100 may use the chemical sensing system 112 for monitoring air external to the aircraft, which may comprise a chemical sensor 150 to provide chemical data reflecting one or more chemical agents in the air. The chemical sensing system 112 may include, or be coupled with, a wind sensor 140 to provide wind data reflecting one or more flow conditions of the air and/or an imaging device 114 to provide image data reflecting one or more environmental features (e.g., a scene having one or more landmarks or reference points). The one or more processors 116 may be configured to identify a navigational waypoint for the aircraft 100 and to provide flight commands to the aircraft (e.g., the flight controller 120) based at least in part on the chemical data, the wind data, and the image data. The processor 116 may process and/or fuse the data from the chemical sensing system 112, wind sensor 140, pressure sensor 160, and/or imaging devices 114 to detect, track, and transmit data on chemical reagents and to navigate the aircraft 100.

The imaging devices 114 may also provide basic vehicle velocity estimates using optical flow techniques to aid in estimating accurate wind speed data. Through optical flow techniques, a processor 116 can process, for example, the pattern of apparent motion of objects, surfaces, and edges in a visual scene caused by the relative motion between an observer (e.g., the aircraft 100) and the scene. Sensor data from the chemical sensors 150, wind sensor 140, and/or imaging devices 114 can be used to enable upwind tracking and verification of chemical plume sources.

Figure 3:
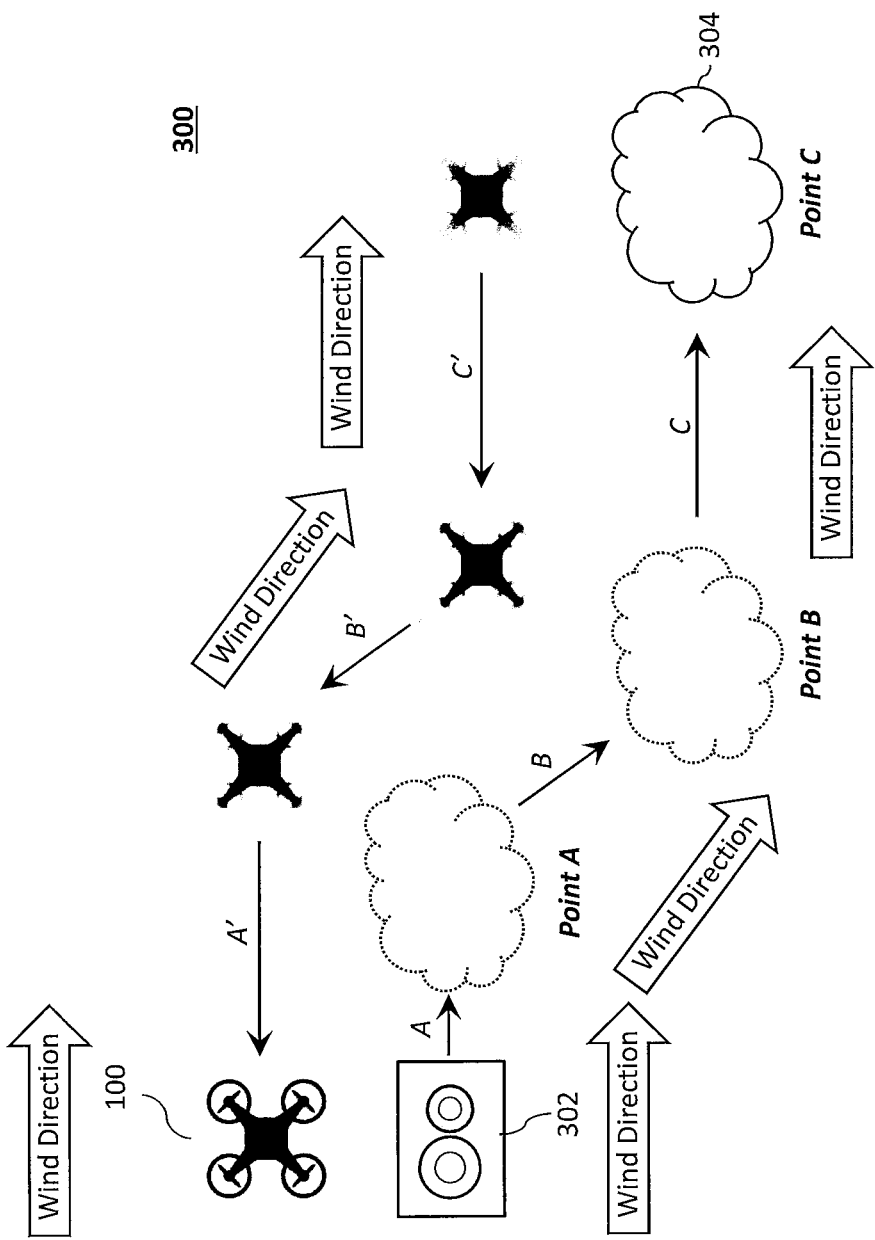

FIG. 3 illustrates an example process diagram 300 of an aircraft 100 that is configured to verify a chemical plume source 302 of a plume 304 through upwind tracking process. In certain aspects, the upwind tracking process comprises tracking the chemical plume 304, using the wind sensor, to the chemical plume source 302 using wind speed and/or wind direction (e.g., wind data) from a position (e.g., a current position of the aircraft 100 or plume 304) to determine a prior position of the chemical plume 304. As illustrated, the starting point (illustrated as Point C, i.e., the current position as illustrated) is upwind of the chemical plume source 302. The aircraft 100 may detect a plume 304 at Point C, a first position. Upon detection of the plume 304 at Point C, the aircraft 100 may determine (e.g., via wind sensor 140) the wind speed and/or direction to determine the direction from which the plume 304 traveled (indicated via Arrow C). Upon determining the direction from which the plume 304 traveled, the aircraft 100 may travel toward the location (e.g., for a predetermined distance) to Point B (indicated via Arrow C'), a prior position. This process may repeat until a location of the chemical plume source 302 is identified.

The distance the aircraft 100 travels from one point to another may be determined as a function of an intensity of the concentration level of the chemical reagent at a certain location as the aircraft 100 travels. The aircraft 100 may travel in a direction until the chemical reagents of the chemical plume is detected again or the intensity of which becomes stronger (i.e., traceable). At which point, this process may be repeated to detect the When the chemical reagents of the chemical plume are undetected by the chemical sensor (e.g., for a predetermined duration of time), the aircraft 100 may be on hold (i.e., hover) until the chemical reagents are detected. Alternatively, the aircraft 100 may trace back to the previous location when no chemical reagents are detected. In some examples, the aircraft 100 may continuously follow the chemical plume upwind when the chemical reagents are detected towards the initial wind source continuously. Thus, the chemical sensor of the aircraft may continuously or continually monitor chemical reagents around its current position.

In some examples, change in wind data may determine the distance the aircraft 100 travels. The aircraft 100, upon determining the previous location of the chemical plume or the direction from which it came, may travel towards the prior position until the wind sensor detects change in wind speed and/or wind direction. Upon detection of the change, the processor 116 may repeat the upwind tracking process. For example, upon arriving at Point B, the aircraft 100 may again determine the wind speed and/or direction to determine the direction from which the plume 304 traveled (indicated via Arrow B). In certain aspects, the direction may be the same, at which point the aircraft 100 may continue traveling along the same path until it arrives at the chemical plume source 302 or detects a change in direction. In the illustrated example, the wind direction may change at Point B. Upon determining the direction at Point B from which the plume 304 traveled, the aircraft 100 may travel toward the location to Point A (indicated via Arrow B').

Upon arriving at Point A, the aircraft 100 may determine the wind speed and/or direction to determine the direction from which the plume 304 traveled (indicated via Arrow A). In the illustrated example, the wind direction again changes at Point A. Upon determining the direction from which the plume 304 traveled, the aircraft 100 may travel from Point A to the last point, which is the chemical plume source 302 (indicated via Arrow A'). While the process diagram 300 illustrates three points (Points A, B, and C), additional or fewer points may be positioned between the starting point of the aircraft 100 (illustrated as Point C) and the chemical plume source 302. The aircraft 100 may be signaled to stop at a point to track the plume 304 upon detection of, for example, a change in wind direction, a change in concentration of chemical plume (e.g., via chemical sensors 150), etc.

The arrows (i.e., routes) presented in FIG. 3 are for illustrative purpose only. The actual routes of the aircraft may be identical or within a close vicinity of the route of the chemical plume's travel as determined or estimated via the upwind tracking process described herein.

The chemical sensors 150 preferably provide a high-sensitivity, high-speed chemical sensing capability to the aircraft 100. The chemical sensors 150 may employ a resonator technology that uses the Lorentz force, arising from current moving in the magnetic field between a pair of magnets, to drive a microfabricated paddle structure into resonance. Phase-lock loop control electronics monitor the paddle resonance frequency, typically about 20 KHz, for example. Mass adsorption into the paddle's chemically-selective coating causes a frequency shift. Use of an uncoated reference paddle allows the cancellation of signal drift caused by environmental factors such as temperature and gas flow, thus allowing to measure with a sensitivity below 50 parts per billion (ppb). A metal heater is directly patterned onto the paddle, allowing for a rapid, high-temperature ramp to desorb captured chemicals directly into micro-samplers or to renew and clean the sensing film. Example chemical sensors 150 include the smart preconcentrator (SPC) of MicroChemlab system, which is available from Sandia National Laboratory.

The chemical sensors 150 may provide both detection and identification of chemical reagents for chemical plume tracking navigation. In addition, the chemical sensors 150 may identify a concentration level or an intensity of chemical reagents within the sample. For example, the chemical sensors 150 may be configured to analyze a sample of air/wind to output data reflecting a list of constituent elements/compounds and associated concentrations (e.g., percentages or parts per million (PPM)) Their location under the propellers (or in other identified areas of high dynamic pressure) may help drive airflow through the chemical sensors 150 and avoid the use of onboard pumps (reducing size, weight, power and cost (SWaP-C)). The wind sensor 140 provides wind direction and velocity estimates, which allows the aircraft 100 to track chemical plumes upwind to the location of their source. The accuracy of the wind data estimates may be further improved via onboard camera data (e.g., from the ISR payload and/or imaging device(s) 114. GPS data from the navigation system 124 may also be employed in environments that are not GPS-denied. The onboard cameras may employ optical flow and other methods to estimate vehicle velocity and to discern the aircraft 100 airspeed from the true airspeed. Motors 108*a* and propellers 108*b* provide VTOL capability, which enable the aircraft 100 to investigate an area thoroughly and methodically.

The wind sensor 140 can by a multi-hole probe, including omnidirectional wind velocity probes, clusters of pitot probes, and/or wind vanes located away from prop wash. The imaging devices 114 may be lightweight and can collect visual information and aid in locating environmental features that may act as chemical sources. Similarly, the visual information from the imaging devices 114 may be processed to identify and detect the chemical plume. For example, certain chemicals may be associated with distinctive colors (resulting in colored smoke) or opaqueness. These, and other visual characteristics of chemical plume, may be stored by the memory device 118 to be utilized to identify the type of chemical and/or track its movement. The algorithm to detect visual characteristic(s) of a chemical plume in an image may be accomplished using various image processing techniques, such as Hough transform. For example, a feature extraction technique may be used in image analysis, computer vision, and digital image processing.

The processor 116 may be configured to identify navigational waypoints and provide commands to the aircraft (e.g., via the flight controller 120) and/or the chemical sensor 150 based on collected data. Example commands to the chemical sensor 150 may include, inter alia, commands to desorb chemicals from the sensing film in the event of saturation.

The aircraft 100 may further be equipped with an ISR payload 126 to collect data and/or monitor an area. The ISR payload 126 may comprise, for example, one or more cameras, audio devices, and other sensors to facilitated ISR functionality and provide ISR data (e.g., photographs, video, audio, sensor measurements, etc.). The ISR payload 126 is operatively coupled to the processor 116 to facilitate communication of the ISR data between the ISR payload 126 and the processor 116. The ISR payload 126 may be rotatably and pivotally coupled to the underside of the airframe 102 (or another structural component, such as the rotor booms 104), for example, via a gimbal device, to enable the ISR payload 126 to be more easily oriented to monitor objects below and/or on the ground. In certain aspects, components of the navigational system may overlap with the ISR payload 126. For example, the one or more imaging devices 114 may be integral with the ISR payload 126.

The environmental features, chemical data, ISR data, and/or other information may be dynamically or periodically communicated from the aircraft 100 to the remote device 130 over the network 128 via the wireless transceiver 122. The environmental features, chemical data, ISR data, and/or other information may also be stored to the memory device 118 for later access or processing. In certain aspects, unprocessed data from the various onboard sensors (e.g., imaging device 114, ISR payload 126, etc.) may be communicated from the aircraft 100 via the wireless transceiver 122 as raw data for remote processing.

The processor 116 will also provide commands to the chemical sensor 150 hardware, such as commands to desorb chemicals from the sensing film in the event of saturation. The use of sensor fusion in this case may be crucial, since desorption command may be based on estimated airflow through the sensor as well as previous concentration measurements. For example, based on wind speed estimates and vehicle velocity estimates, the dynamic pressure may be estimated at the chemical sensors 150 beneath the propeller in real time. Alternatively, pressure sensors may be placed under the propellers to measure the dynamic pressure directly at the chemical sensor inlet port 152. Combining this data with chemical concentration measurements, the processor 116 can estimate the amount of chemicals that have flowed through the sensor and decide an appropriate time for sensor desorption.

In certain aspects, navigational schemes for the aircraft 100 may be inspired from natural system. For example, male moths employ a meandering route to track complex chemical plumes upwind during mating. For insects, such as the moth, locating important resources from long distances requires a complex behavior to track odors that have evaporated from their source and been moved downstream or downwind as turbulent distributions of odor molecules. The remarkable ability of the moth to track these plumes through dynamically changing environments is assumed to be in part due to the position of their odor sensors. Therefore, biological principles from plume tracking organisms may be used to evaluate potential sensor locations. Similar to a quad-rotor UAS, the beating wings of the moth generate a disk-shaped ring of turbulence that is driven below the insect's body and induces a flow from head to tail. Some measurements suggest that the forward projecting odor-detecting antennae are outside the influence of the wingbeat-generated turbulence and could benefit from the sample of air pulled through the sensors, but this has not been demonstrated. The chemical sensors 150 positioned on the front of the UAV's airframe 102, like insect antennae, may be optimal for the task, or a constraint that the biological systems must deal with.

Figure 4A:
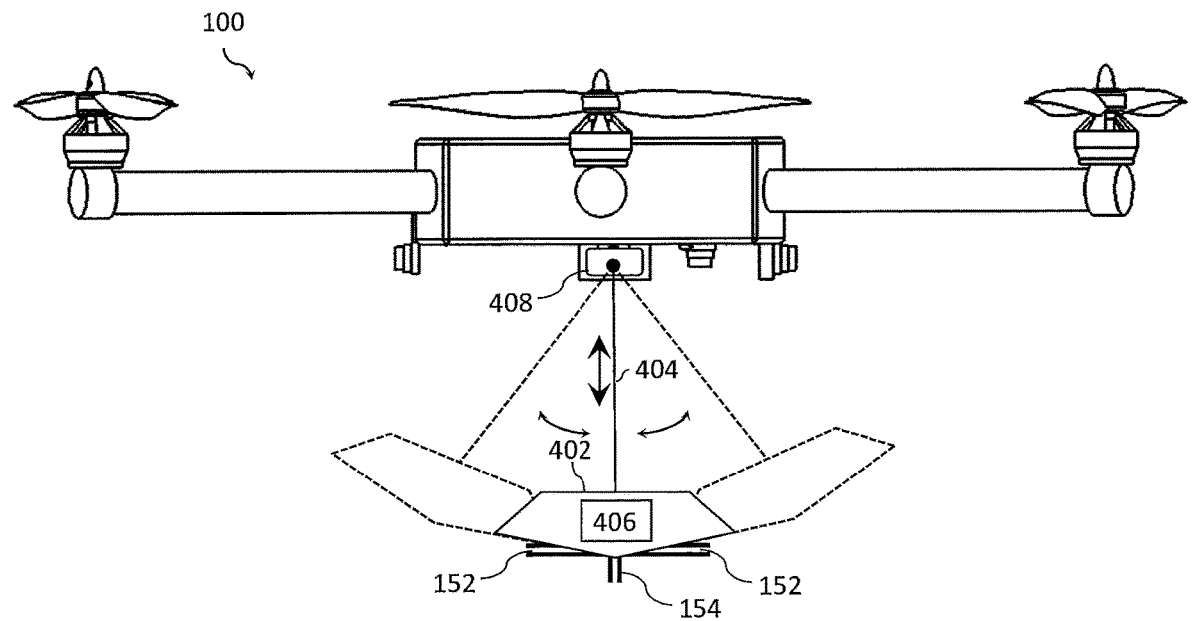

While FIG. 1*a* generally illustrates the chemical sensing system 112 and other sensors (e.g., wind sensor 140 and pressure sensor 160) as coupled directly to, or integrated with, the aircraft 100, the chemical sensing system 112 and one or more of the other sensors may be provided as an external payload 402. FIG. 4*a* illustrates an exemplary multi-rotor VTOL UAV aircraft 100 equipped with a slung-load sensor payload 120 to provide chemical releasing and/or sensing. As illustrated, the external payload 402 may be suspended from the underside of the aircraft 100 in a slung-load arrangement via, for example, a tether 404 coupled to the airframe 102 via a slung-load control apparatus 408.

As described in connection with the aircraft 100 of FIG. 1*a*, an objective of the internal sensors 406 is to provide a mobile sensor that can be deployed quickly to a remote location to monitor or measure for potential threats. For example, the external payload 402 may be placed and/or delivered by the aircraft 100 to a desired location, though the external payload 402 may still operate while airborne (e.g., to track a plume in real time or near real-time—as discussed above). The external payload 402 may include one or more chemical sensor inlet ports 152 to direct air from the environment toward the internal sensors 406 of the external payload 402. The internal sensors 406 may include, for example, the chemical sensing system 112, wind sensor 140, pressure sensor 160, etc. The external payload 402 may include one or more outlet ports 154 to expel the air from the external payload 402. In certain aspects, the external payload 402 may be mounted on a gimbal device.

Suspending the external payload 402 in the illustrated slung-load arrangement can serve to decouple the dynamics of flight of the aircraft 100 from the dynamics of chemical sensing (e.g., external payload 402), thereby addressing challenges brought on by wind, vibration, isolation, etc. Indeed, such sensors often rely on precise and accurate vibrational analysis of micro-electro-mechanical devices, which is easier to perform in a static environment. Therefore, while a payload may be rigidly attached to the body (e.g., the airframe 102) of the aircraft 100 at or near the center of mass, this location may not be ideal for a chemical sensor due to effects of airflow, EMI (Electromagnetic Interference), and mechanical vibrations. Therefore, the external payload 402 may be arranged in a slung-load arrangement that can be lowered (or dropped) below the aircraft 100.

When slung (i.e., lowered), the sensors (e.g., chemical sensor) of the external payload 402 will be physically removed from the strongest air flow and EMI from the aircraft 100. Further, the pendulum effect afforded via the tether 404 can act as a mechanical low-pass-filter, thereby reducing vibrations of the aircraft 100 from passing to the external payload 402. In other words, the external payload 402 will operate outside of the strong downwash of the aircraft 100, and the tether 404 of the slung load can act as a low-pass filter of high frequency vibrations generated by the aircraft 100.

As illustrated, the aircraft 100 may include a slung-load control apparatus 408 configured to retract (e.g., draw in) and deploy (e.g., extend or pay out) the tether 404, thereby adjusting the distance between the underside of the airframe 102 and the external payload 402 (as indicated by the arrow). The external payload 402 may include, for example, a winch and/or control circuitry to drive the winch selectively to draw in or pay out tether 404 based on commands from the aircraft 100, remote device 130, a local sensor suite, etc. For example, the aircraft 100 may secure the external payload 402 close to the aircraft 100 during transport flight by drawing in the tether 404, and then deploy the external payload 402 below the aircraft 100 during active chemical sensing (e.g., upon arrival at a sensing location). Securing the external payload 402 at, or close to, the aircraft 100 addresses airflow, vibration, and EMI needs of operating the chemical sensor during flight.

Figure 4B:
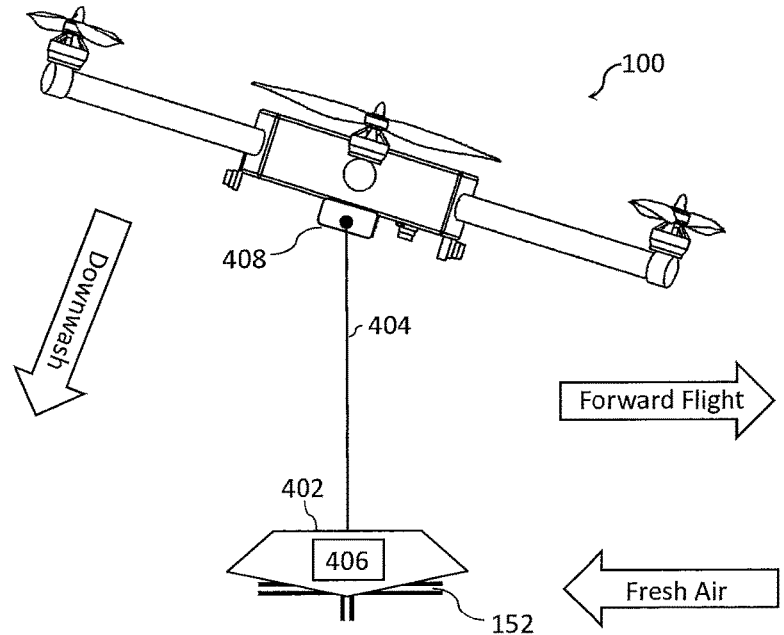

In addition, the flight controller 120 of the aircraft may be configured to compensate for forces imparted upon the external payload 402 from the aircraft 100 or upon the aircraft 100 via the external payload 402 through the tether 404. With reference to FIG. 4b, the flight controller 120 may provide different flight settings based on the status of the external payload 402 (e.g., whether deployed or retracted). When the external payload 402 is deployed (e.g., slung or lowered), the flight controller 120 may be configured to operate the aircraft 100 so that it can receive fresh air (e.g., air not from the down wash of the propulsor 108) at the inlet port(s) 152, thereby improving its sensor capabilities. For example, as illustrated in FIG. 4b, the flight controller 120 may be configured to move the aircraft 100 at a steady, forward velocity during air intake at the external payload 402 so that the internal sensors 406 can receive fresh, undisturbed air at the inlet port(s) 152.

The above-cited patents and patent publications are hereby incorporated by reference in their entirety. Where a definition or the usage of a term in a reference that is incorporated by reference herein is inconsistent or contrary to the definition or understanding of that term as provided herein, the meaning of the term provided herein governs and the definition of that term in the reference does not necessarily apply. Although various embodiments have been described with reference to a particular arrangement of parts, features, and the like, these are not intended to exhaust all possible arrangements or features, and indeed many other embodiments, modifications, and variations will be ascertainable to those of skill in the art. Thus, it is to be understood that the teachings of the subject disclosure may therefore be practiced otherwise than as specifically described above.

What is claimed is:

1. A chemical sensing system comprising:
a chemical sensor to provide chemical data reflecting one or more chemical agents in air external to a vehicle;
a wind sensor to provide wind data reflecting one or more flow conditions of the air;
an imaging device to provide image data reflecting a field of view that is external to the vehicle; and
a processor to fuse the chemical data, the wind data, and the image data and to identify a source of the one or more chemical agents, identify a navigational waypoint for the vehicle as a function of the source of the one or more chemical agents, and provide commands to the vehicle based at least in part on the fusion of the chemical data, the wind data, and the image data, wherein the vehicle is configured to navigate to the navigational waypoint as a function of the commands.

2. The chemical sensing system of claim 1, wherein the processor is configured to process the image data to identify visual characteristics of the one or more chemical agents.

3. The chemical sensing system of claim 1 further comprising a chemical discharge port to discharge a chemical agent from a chemical storage unit aboard the vehicle.

4. The chemical sensing system of claim 1 further comprising a pressure sensor to detect dynamic pressure adjacent the chemical sensor.

5. The chemical sensing system of claim 1, wherein the processor is configured to send a command to desorb chemicals from a sensing film of the chemical sensor upon saturation of the sensing film.

6. An aircraft for sensing air external to the aircraft, the aircraft comprising:
an airframe;
a propulsor operatively coupled to the airframe;
a chemical sensor to provide chemical data reflecting one or more chemical agents in the air, the chemical sensor fluidly coupled to an inlet port and to an outlet port;
a wind sensor to provide wind data reflecting one or more flow conditions of the air;
an imaging device to provide image data reflecting a field of view that is external to the aircraft; and a processor communicatively coupled with the chemical sensor and the wind sensor, the processor configured to:
command the aircraft based at least in part on a fusion of the chemical data, the wind data, and the image data;
process the chemical data and the wind data to detect a chemical plume comprising a predetermined chemical agent;
identify a source location of the chemical plume based at least in part on the chemical data or the wind data; and
identify the source location of the chemical plume through an upwind tracking process.

7. The aircraft of claim 6, wherein the processor is configured to identify a navigational waypoint and to provide commands to a flight controller of the aircraft based at least in part on the chemical data and the wind data.

8. The aircraft of claim 6, wherein the processor is configured to process the image data to identify visual characteristics of the chemical plume.

9. The aircraft of claim 6, wherein the processor is configured to identify a path of the chemical plume based at least in part on the wind data.

10. The aircraft of claim 9, wherein the processor is configured to determine a velocity vector reflecting speed and direction of the chemical plume based at least in part on the wind data.

11. The aircraft of claim 6, wherein the upwind tracking process comprising tracking the chemical plume to the source location using, at least partially, the wind data from a position to determine a prior position of the chemical plume, the wind data comprising a wind speed and a wind direction.

12. The aircraft of claim 6, wherein the inlet port is positioned on the aircraft within prop wash generated by the propulsor and arranged to face the propulsor.

13. The aircraft of claim 6, wherein the outlet port is positioned on the aircraft and configured to expel air away from the propulsor.

14. The aircraft of claim 6, wherein the processor is configured to estimate a flight path as a function of the chemical data and the wind data.

15. The aircraft of claim 6, wherein the processor is configured to determine an odor intensity based at least in part on the chemical data.

16. The aircraft of claim 6, wherein the chemical sensor is provided via an external payload.

17. The aircraft of claim 16, wherein the external payload is configured to be suspended from the aircraft via a tether in a slung-load arrangement.

18. A method for navigating an aircraft to a source of a chemical agent, the method comprising:
receiving chemical data from a chemical sensor reflecting one or more chemical agents in air external to the aircraft;
receiving wind data from a wind sensor reflecting one or more flow conditions of the air;
receiving image data from an imaging device reflecting a field of view that is external to the aircraft;
fusing, via a processor, the chemical data, the wind data, and the image data, wherein the processor is operatively coupled to the chemical sensor, the wind sensor, and the imaging device;
identifying, via the processor, a navigational waypoint based at least in part on the chemical data, the wind data, and the image data; and
identifying, via the processor and by using an upwind tracking process, a source location of a chemical plume based at least in part on the chemical data or the wind data.

19. The method of claim 18, further comprising the step of detecting, via a pressure sensor, dynamic pressure adjacent the chemical sensor.

20. The chemical sensing system of claim 1, wherein the processor is configured to process the image data to determine a wind speed using one or more optical flow techniques.

* * * * *